(12) United States Patent
Takeda et al.

(10) Patent No.: US 6,587,148 B1
(45) Date of Patent: *Jul. 1, 2003

(54) REDUCED ALIASING DISTORTION OPTICAL FILTER, AND AN IMAGE SENSING DEVICE USING SAME

(75) Inventors: Nobuhiro Takeda, Kawasaki (JP); Takashi Sasaki, Chigasaki (JP); Masato Ikeda, Higashikurume (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 55 days.

(21) Appl. No.: 08/697,628

(22) Filed: Aug. 28, 1996

(30) Foreign Application Priority Data

Sep. 1, 1995 (JP) ................................ 7-248376
Sep. 12, 1995 (JP) ................................ 7-234173
Oct. 17, 1995 (JP) ................................ 7-268527

(51) Int. Cl.$^7$ ............................................ H04N 5/225
(52) U.S. Cl. .................................. 348/342; 348/219.1
(58) Field of Search ......................... 348/219.1, 342; 357/209, 211, 210, 494, 495; 250/225

(56) References Cited

U.S. PATENT DOCUMENTS

| 4,176,951 | A | * | 12/1979 | Robert et al. ................ 356/33 |
| 5,063,450 | A | * | 11/1991 | Pritchard .................... 348/219 |
| 5,093,649 | A | * | 3/1992 | Johnson ..................... 342/157 |
| 5,245,416 | A | * | 9/1993 | Glenn ........................ 348/219 |
| 5,282,043 | A | * | 1/1994 | Cochard et al. ............. 348/219 |
| 5,307,170 | A | * | 4/1994 | Itsumi et al. ............... 348/219 |
| 5,512,951 | A | * | 4/1996 | Torii .......................... 348/353 |
| 5,543,839 | A | * | 8/1996 | Suda et al. ................. 348/349 |
| 5,561,460 | A | * | 10/1996 | Katoh et al. ............... 348/219 |
| 5,781,236 | A | * | 7/1998 | Shinbori et al. ............. 348/342 |
| 5,923,371 | A | * | 7/1999 | Iijima ......................... 348/356 |
| 5,978,027 | A | * | 11/1999 | Takeda ....................... 348/348 |
| 6,091,452 | A | * | 7/2000 | Nishiyama .................. 348/349 |
| 6,094,223 | A | * | 7/2000 | Kobayashi .................. 348/354 |
| 6,163,340 | A | * | 12/2000 | Yasuda ....................... 348/345 |
| 6,385,393 | B1 | * | 5/2002 | Ohta ........................... 348/345 |

* cited by examiner

*Primary Examiner*—Wendy R. Garber
*Assistant Examiner*—Jacqueline Wilson
(74) *Attorney, Agent, or Firm*—Morgan & Finnegan, LLP

(57) ABSTRACT

During the exposure of an image sensing device, the optical image of a subject is rotated by one revolution or a plurality of revolutions relative to the sensing surface of the image sensing device along a plane perpendicular to the plane of the image sensing device while the orientation of the image is maintained substantially horizontally and vertically with respect to the sensing surface. The radius r of this rotation is set so as to satisfy the equation $$r = \frac{\omega_0}{2\pi\rho}$$

where $\rho$ represents trap frequency and $\omega_0$ the initial zero point of a Bessel function of the first kind of order zero.

37 Claims, 13 Drawing Sheets

REAL SPACE

FOURIER SPACE

FIG. 14
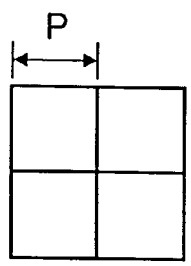
FIG. 15
| Cy | Ye | Cy |
|----|----|----|
| Mg | G  | Mg |
| Cy | Ye | Cy |
P
FIG. 16
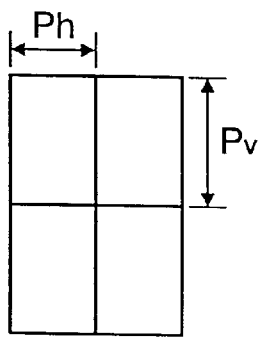

REDUCED ALIASING DISTORTION OPTICAL FILTER, AND AN IMAGE SENSING DEVICE USING SAME

BACKGROUND OF THE INVENTION

This invention relates to an optical spatial filter device and an image sensing apparatus using this device. More particularly, the present invention relates to improvements in an optical spatial filter device for limiting or attenuating specific spatial frequency components (e.g., high-frequency components) in the image of a subject when a still picture or moving picture is sensed using an image sensing apparatus.

In an image sensing apparatus using an image sensing device such as a CCD, the image of a subject that has been formed on the image sensing device is subjected to spatial sampling. Consequently, when the image of a subject which includes frequency components greater than half the sampling frequency (i.e., greater than the Nyquist frequency) is sensed, aliasing distortion occurs and appears as moiré in the image obtained from the image sensing device. The result is a pronounced decline in image quality.

In an image sensing apparatus of this kind, therefore, the general practice is to suppress the occurrence of moiré by utilizing a birefringence plate comprising quartz or the like disposed between an image sensing lens and the image sensing device, as disclosed in the Japanese Patent Publication (KOKOKU) No. 58-14116. Such a birefringence plate is referred to as an optical low-pass filter and separates incident light into ordinary light and extraordinary light by the action of birefringence. As there is an offset between the ordinary light and extraordinary light, the image appears blurred and frequency components above the Nyquist frequency are limited or cut off.

However, the effects of an optical low-pass filter that utilizes the birefringence of a quartz crystal or the like act in only one dimension. Accordingly, in an image sensing apparatus using the conventional image sensing device, it is required that a plurality of birefringence plates be combined in order to realize a two-dimensional spatial-frequency limiting characteristic. Placing a plurality of birefringence plates in an optical path is disadvantageous in that this expedient lengthens the optical path of the image sensing apparatus.

Further, it is known that the Nyquist frequency for one color and the Nyquist frequency for all pixels differ in an image sensing apparatus that uses a single-plate color image sensing device (such as a single plate CCD) on which a color filter array is disposed.

Accordingly, to obtain a color image having good resolution using a color image sensing apparatus, it is required that the spatial-frequency limiting characteristics of the applied optical low-pass filters of quartz or the like be made varied so that the characteristic for the image of a luminance signal will be different from that for the image of a color signal. However, in order to change the spatial-frequency limiting characteristics of the optical low-pass filters in the prior art, a plurality of optical low-pass filters having different spatial-frequency limiting characteristics are provided to be interchanged. The filters can only be interchanged by insertion and removal. A practical problem which arises is that it is difficult to momentarily interchange low-pass filters by insertion and removal. This means that it is difficult to change the spatial-frequency limiting characteristic in real-time.

SUMMARY OF THE INVENTION

An object of the present invention is to provide an optical spatial filter device and an image sensing apparatus using this device, wherein it is possible to vary a two-dimensional spatial-frequency limiting characteristic in real-time through a comparatively simple arrangement.

Another object of the present invention is to provide an image sensing apparatus and an optical spatial filter device for obtaining a target spatial frequency characteristic by rotating an optical image along a circle or ellipse of a predetermined radius relative to an image sensing device.

According to an aspect of the present invention, the path of rotation is closed.

According to another aspect of the present invention, the path of rotation is circular or elliptical.

According to yet another aspect of the present invention, rotation is realized by a glass plate with parallel, flat surfaces.

According to yet another aspect of the present invention, rotation is performed by rotating the image sensing device.

According to yet another aspect of the present invention, rotation is performed an integral number of times during an exposure interval of the image sensing device.

According to yet another aspect of the present invention, rotation is performed at uniform angular velocity.

According to yet another aspect of the present invention, radius of rotation or radius of curvature is decided in correlation with a frequency to be trapped.

Another object of the present invention is to provide an image sensing apparatus and an optical spatial filter device for obtaining a target spatial frequency characteristic by moving the focal-point position of an optical image back and forth relative to an image sensing device in parallel with the direction of the optic axis.

A further object of the present invention is to provide an image sensing apparatus and filter for obtaining a target spatial frequency characteristic by superposing two periodic motion modes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a diagram showing the pixel array of a monochrome image sensing device having pixels in a square array used in the third embodiment;

FIG. 15 is a diagram showing the pixel array of a color image sensing device having pixels in a square array used in the third embodiment;

FIG. 16 is a diagram showing the pixel array of a monochrome image-sensing device having pixels in a non-square array used in the third embodiment;

DESCRIPTION OF THE PREFERRED EMBODIMENTS

Two preferred embodiments of the present invention will now be described in detail with reference to the accompanying drawings. In these embodiments, a spatial-frequency limiting device according to the present invention is applied to an image sensing apparatus.

More specifically, in the first embodiment, the spatial frequency components of light forming an image on an image sensing device are controlled by rotating the light of an image about an optic axis during an exposure interval at a position in front of the image sensing device. In the second embodiment, the spatial frequency components of light are controlled by moving the position of an optical lens back and forth in a direction parallel to the optic axis in the exposure interval.

First Embodiment

Figure 1:
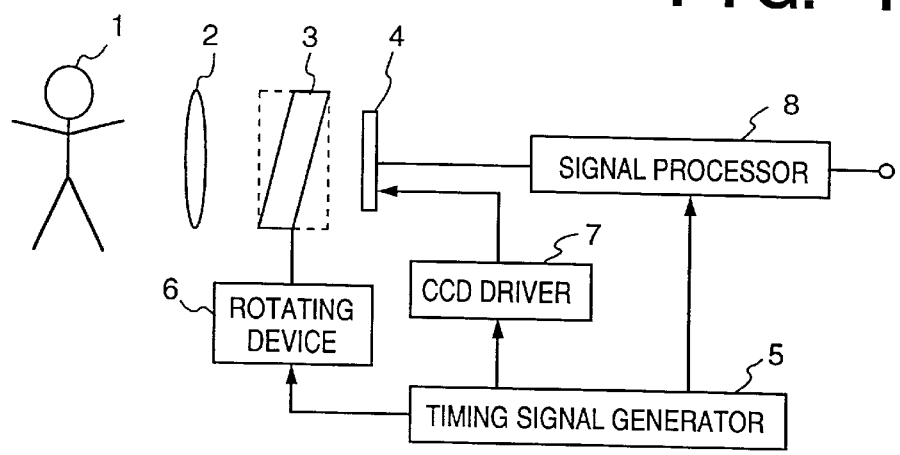
FIG. 1 is a diagram showing the configuration of an image sensing apparatus according to a first embodiment of the present invention.

FIG. 1 is a diagram showing the configuration of an image sensing apparatus according to a first embodiment of the present invention.

As shown in FIG. 1, an optical system 2 forms the image of a subject 1 on the sensing surface of an image sensing device 4 through a glass plate 3 having two parallel, flat surfaces. The normal line to the surfaces is inclined at a prescribed angle (described later) with respect to the optic axis of the-optical system 2. The image sensing device 4 comprises a CCD or the like. A timing signal generator 5 generates drive timing signals for the image sensing device 4, a rotating device 6 (described later) and a signal processor 8. The rotating device 6 rotates the glass plate 3 about the optic axis. A CCD driver 7 drives and controls the image sensing device 4. Specifically, the CCD driver 7 converts the output signal of the timing signal generator 5 to a signal for driving and controlling the image sensing device 4 and delivers this signal to the image sensing device 4. The signal processor 8 applies various signal processing to the image signal opto-electrically converted and outputted by the image sensing device 4, outputs the processed results as image data, delivers the image data to a monitor or the like (not shown) and stores the image data in a memory, etc.

In this embodiment, the glass plate 3 and rotating device 6 construct means for controlling the spatial frequency of an image in real-time.

The principle in accordance with which spatial frequency is controlled will now be described with reference to FIGS. 2 through 5.

Figure 2:
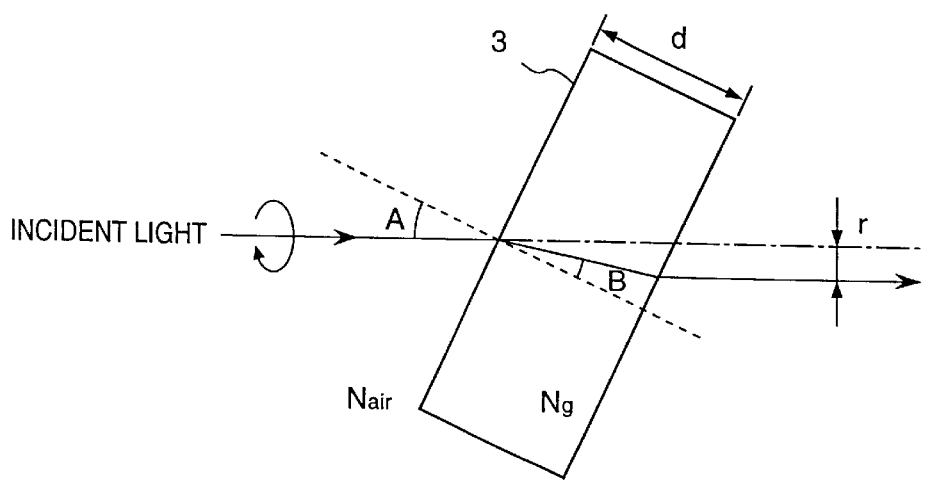
FIG. 2 is a diagram for describing refraction when a light ray impinges upon a glass plate with parallel, flat surfaces, which are used in the first embodiment, at an incidence angle A.

FIG. 2 is useful in describing refraction when a light ray impinges upon the glass plate 3 at an incidence angle A. A light ray which has passed through the glass plate 3 exits as a light ray parallel to the incident ray but spaced away from the axis of incidence by a distance r. If we let d represent the thickness of the glass plate and A the angle of incidence, then the offset distance from the optic axis will be expressed as follows:

$$r = \frac{d}{\cos B} \cdot \sin(A - B) \tag{1}$$

where B represents the angle of refraction. If we let $N_{air}$ represent the refractive index of air and $N_g$ the refractive index of the glass plate, then B may be expressed by the following equation:

$$B = \sin^{-1}\left(\frac{N_{air}}{N_g} \cdot \sin A\right) \tag{2}$$

Figure 3A:
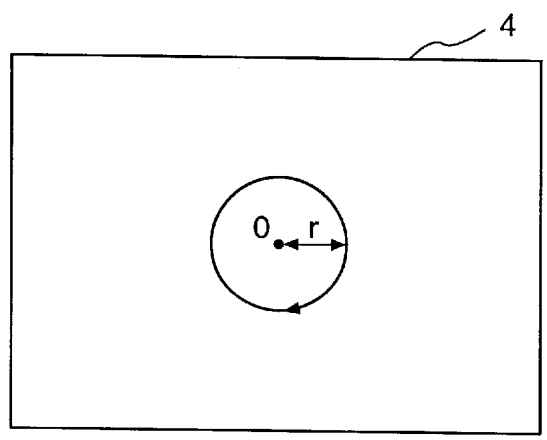
FIGS. 3A and 3B are diagrams illustrating the manner in which an optic axis rotates when the glass plate with parallel, flat surfaces is rotated.
Figure 3B:
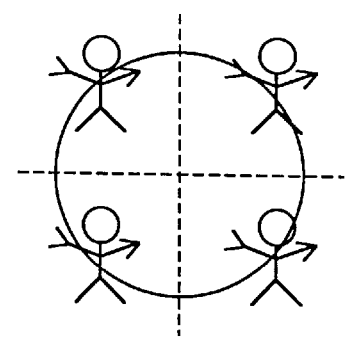

The meaning of equations (1) and (2) is that the offset distance r is decided by the incidence angle A if use is made of a glass plate having a thickness d and refractive index $N_g$. In other words, if the incidence angle A is held at a certain value and the glass plate 3 is rotated about the optic axis, the image on the optical path will rotate about the optic axis while maintaining the distance r. That is, if the inclination angle A and the thickness d of the glass plate 3 are set to certain values and the glass plate 3 is rotated about the optic axis by the rotating device 6, then the image obtained on the image sensing device 4 (the wording "on the image sensing device 4" will be used below to mean "on the sensing surface of the image sensing device 4") will describe a circle, as shown in FIG. 3A. More specifically, the image of the subject 1 formed on the sensing surface will undergo circular revolution on a circle of radius r while its orientation vertically and horizontally remains the same on the sensing surface, as depicted in FIG. 3B.

The rotating device 6 rotates the glass plate 3 at a uniform velocity one or more revolutions at a constant angular velocity α during an exposure interval T of the image sensing device 4. If exposure is performed using a mechanical shutter, then the "exposure interval T" is the time during which the shutter is open. If use is made of an electronic shutter such as a CCD sensor serving as the image sensing device, the "exposure interval T" is the period of time from the moment readout of the image signal from the image sensing device starts to the moment readout of the next image signal from the image sensing device starts.

The coordinates (x, y) of the image of one point on the subject 1 formed on the image sensing device 4 at time t are as follows:

$$\left. \begin{array}{l} x = r \cdot \cos(\alpha \cdot t) \\ y = r \cdot \sin(\alpha \cdot t) \end{array} \right] \quad (3)$$

The image of the subject formed at a certain point on the image sensing device 4 within the exposure interval T of the image sensing device 4 is equivalent to an image that would be obtained when the subject image is formed at a certain point on the image sensing device 4 upon having passed through a spatial filter having a certain predetermined characteristic. The characteristic of this spatial filter should be obtained by applying a Fourier transform to Equation (3).

A technique for designing this spatial filter will now be described.

In general, a two-dimensional Fourier transform of a function f(x) is expressed by the following equation:

$$F(u, v) = \int \int_{-\infty}^{\infty} f(x, y) e^{-2\pi i(ux+vy)} dx dy \quad (4)$$

Figure 4A:
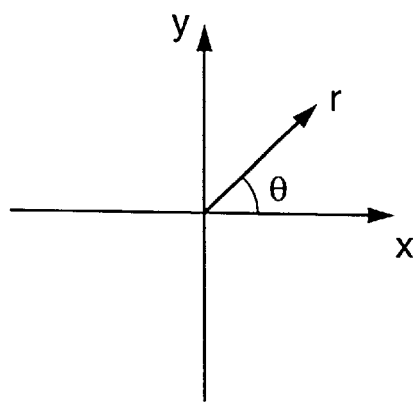
FIGS. 4A and 4B are diagrams in which real space and Fourier space, respectively, are represented by polar coordinates.
Figure 4B:
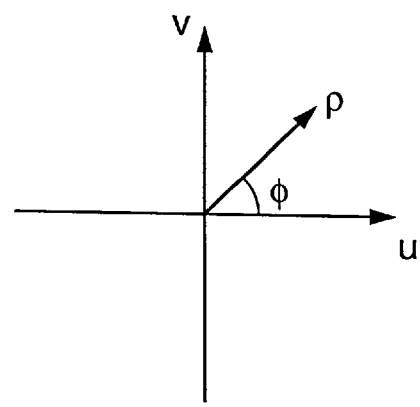

Equation (3) signifies a transformation from an orthogonal coordinate system to a polar coordinate system, and Equation (4) represents a Fourier transform of Equation (3). Accordingly, Equation (4) is expressed using polar coordinates. When this coordinate transformation is performed, an (r, θ) coordinate system is used with respect to an orthogonal coordinate system in regard to real space, as shown in FIG. 4A, and a (ρ, φ) coordinate system is used with respect to a uv orthogonal coordinate system in regard to Fourier space, as shown in FIG. 4B. Accordingly, Equation (4) is written as follows:

$$F(\rho, \phi) = \int_0^\infty r \cdot f(r) dr \int_0^{2\pi} e^{-2\pi i r \rho \cos(\theta - \phi)} d\theta \quad (5)$$

A Bessel function of the first kind of order zero is represented by $$J_0(\alpha) = \frac{1}{2\pi} \int_0^{2\pi} e^{-\alpha i \cos(\theta - \phi)} d\theta \quad (6)$$

If this is substituted into Equation (5), we obtain $$F(\rho) = 2\pi \int_{-\infty}^{\infty} r \cdot f(r) \cdot J_0(2\pi r \rho) dr \quad (7)$$

Since Equation (7) is a function solely of the spatial frequency ρ and does not contain φ explicitly, F(ρ) is rotationally symmetric.

Accordingly, the spatial frequency characteristic of the image sensing apparatus of FIG. 1, in which the image of the subject is circularly revolved on the sensing surface, is expressed as follows:

$$F(\rho) = 2\pi r \cdot J_0(2\pi r \rho) \quad (8)$$

Since Equation (8) is a function of (r), the cut-off frequency possessed by the spatial frequency characteristic indicated by Equation (8) can be set at will by changing the value of the radius r. In order to change the value of the radius r, it is obvious from Equations (1), (2) that it will suffice to change at least one of the set angle A, thickness d and refractive index $N_g$ of the glass plate 3.

Figure 5:
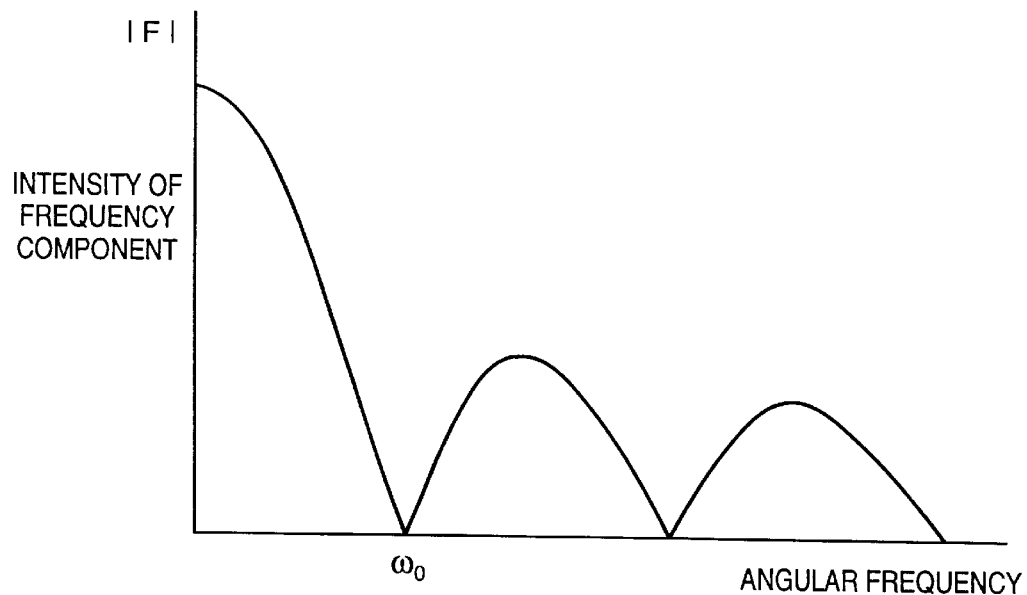
FIG. 5 is a spatial frequency characteristic (one dimensional) of a spatial filter according to the first embodiment.

FIG. 5 is a characteristic diagram (one dimensional) illustrating the filter spatial frequency characteristic of Equation (8). Angular frequency is plotted along the horizontal axis and intensity |F| of the frequency component along the vertical axis. The initial 0 point of a Bessel function of the first kind of order zero is already known. To set the cut-off frequency at this point, the offset distance r is set as follows:

$$r = \frac{\omega_0}{2\pi \rho} \quad (9)$$

where $\omega_0$ in Equation (9) is the initial 0 point of the Bessel function and the value thereof is about 2.4 (from a numerical table).

The spatial frequency of aliasing distortion produced by sampling can be measured. If we let $\rho_0$ represent this spatial frequency, the spatial frequency which should make the intensity zero in order to prevent the occurrence of moiré due to aliasing distortion will be $r_0$. Accordingly, any one of the set angle A, thickness d and refractive index $N_g$, preferably the angle A, is determined so as to obtain an $r_0$ which will satisfy the equation $$r_0 = \frac{\omega_0}{2\pi \rho_0} \quad (10)$$

The foregoing is a description, in accordance with the first embodiment, of a method of designing a spatial filter for the purpose of preventing moiré caused by aliasing distortion, specifically a spatial filter constructed by the glass plate 3 and rotating device 6.

Example 1

Figure 6:
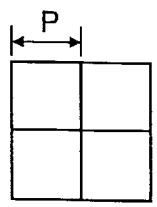
FIG. 6 is a diagram showing the pixel array of a monochrome image sensing device having pixels in a square array.

In a case where the image sensing device 4 is a monochrome image sensing device having pixels in a square array the pitch whereof is P mm, as shown in FIG. 6, the spatial sampling frequency of the image sensing device 4 is 1/P. Therefore, the spatial frequency of aliasing distortion will be half the sampling frequency. That is, we have the following relation: Nyquist frequency $\rho_0 = 1/(2P)$. The frequency $\rho_0$ is a so-called trap frequency, namely a frequency which makes the intensity zero. Accordingly, in order to prevent moiré in the monochrome image sensing device having a square array of pixels of pitch P mm, the radius r of circular revolution is set as follows on the basis of Equation (10):

$$r = \frac{\omega_0 P}{\pi} \approx 0.76 \cdot P \text{ (mm)} \quad (11)$$

the glass plate 3 is designed to give this r based upon Equations (1), (2), and this glass plate is rotated one revolution at the uniform angular velocity α during the exposure interval of the image sensing device 4. As a result of this operation, the trap frequency is set to $\rho_0$ and moiré in the image is reduced.

Example 2

Figure 7:
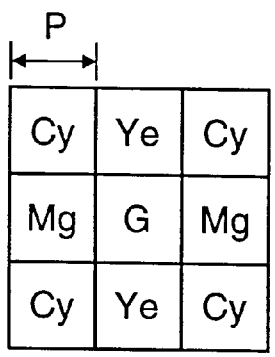
FIG. 7 is a diagram showing the pixel array of a color image sensing device having pixels in a square array.

In a case where the image sensing device 4 is a color image sensing device having pixels in a square array the pitch whereof is P mm, as shown in FIG. 7, the following design is adopted: Specifically, since the spatial sampling frequency is 1/(2P) with respect to the color images, it will suffice to adopt a design such that the relation: trap frequency $\rho_0=1/(4P)$ is satisfied in order to reduce color aliasing distortion. Accordingly, if the conditions of the glass plate 3 are set so as to establish the relation $$r_0 = \frac{2\omega_0 P}{\pi} \approx 1.53 \cdot P \text{ (mm)} \tag{12}$$

color moiré in the image will be reduced.

Furthermore, since the sampling frequency is 1/P, in the same manner as in the monochrome image sensing device, with respect to a luminance image, the conditions of the glass plate 3 are set in such a manner that the radius r of circular revolution will become as follows:

$$r_0 = 0.76 \cdot P(\text{mm}) \tag{13}$$

the glass plate is rotated one revolution at the uniform angular velocity α during the exposure interval T of the image sensing device 4 and the color images are combined to obtain a high-resolution color image.

In the first embodiment, the trap frequency is made half the sampling frequency. However, the object of the present invention can be attained if the trap frequency falls within a range of 0.4~0.6 of the sampling frequency. This range is expressed by the wording "approximately half" in the claims.

Second Embodiment

The first embodiment has been described in regard to a case where the image of a subject formed on a sensing surface is rotated along a circle with respect to the sensing surface. This is because the image sensing device of the first embodiment is a square array.

The second embodiment deals with a case in which a monochrome image sensing device having a non-square array of elements is used.

Figure 8A:
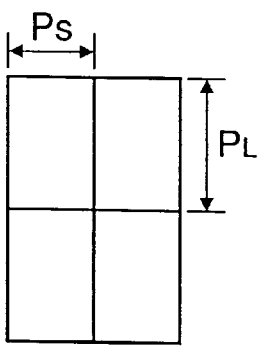
FIG. 8A is a diagram showing the pixel array of a monochrome image sensing device having pixels in a non-square array.

By way of example, the principle in accordance with which a filter for preventing the occurrence of moiré is designed will be described for in a case where use is made of a monochrome image sensing device having a non-square array of pixels, namely an array in which the pixel pitch $P_L$ in the vertical direction of the image sensing device 4 is greater than pixel pitch $P_S$ in the horizontal direction thereof, as shown in FIG. 8A.

Since the image sensing device 4 in this example has a pitch which differs in the vertical and horizontal directions, the spatial frequency of aliasing distortion also will differ in the horizontal and vertical directions. Accordingly, radii $r_S$, $r_L$ of rotational displacement by the rotating device 6 for the purpose of suppressing moiré which occurs in the horizontal direction and a different moiré which occurs in the vertical direction must be obtained from Equation (9). That is, $r_S$ and $r_L$ are obtained as follows:

$$r_S = \frac{\omega_0}{2\pi\rho_S} \tag{14}$$

$$r_L = \frac{\omega_0}{2\pi\rho_L} \tag{15}$$

Figure 8B:
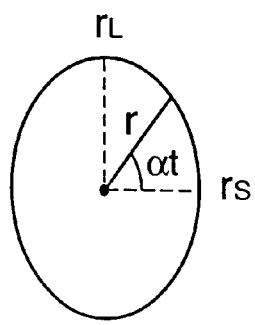
FIG. 8B is a diagram showing a path for a spatial filter usable in a monochrome image sensing device having pixels in a non-square array.

In order to suppress moiré produced at two trap frequency values, the present invention does not require the use of two rotating devices and two glass plates. Instead, according to the second embodiment, the rotating device 6 changes the inclination angle A of the glass plate 3 in such a manner that the path of the point offset the distance r from the optic axis by the glass plate 3 will define an ellipse (see FIG. 8B) whose major and minor axes are $r_L$ and $r_S$, respectively, of Equation (14). The glass plate 3, inclined at the angle A, is rotated one revolution at the uniform angular velocity α during the exposure interval T.

As a result of this operation, the light of the image at a certain time t will move along the elliptical path $$\frac{r^2 \cos^2 \alpha t}{r_S^2} + \frac{r^2 \sin^2 \alpha t}{r_L^2} = 1 \tag{16}$$

Since r in Equation (16) must satisfy Equation (1), the incidence angle A is varied with the passage of time t so as to satisfy the following equation:

$$A = \sin^{-1} \frac{\cos B}{d \cdot \sqrt{\frac{\cos^2 \alpha t}{r_S^2} + \frac{\sin^2 \alpha t}{r_L^2}}} + B \tag{17}$$

where the angle B must satisfy Equation (2).

Since the spatial frequency to be trapped is already known when the filter of the second embodiment is designed, $r_S$, $r_L$ can be calculated in accordance with Equations (14), (15). Since thickness d and refractive index n, etc., also are known, the change in incidence angle A in accordance with Equation (17) can be calculated in advance. In actuality, the rotating device 6 uses a motor or the like to rotate a cam having a shape that reflects Equation (17). Accordingly, the incidence angle A of the image light incident upon the rotating glass plate 3 varies so as to satisfy Equation (17).

Thus, in accordance with the spatial filter device and image sensing apparatus of the second embodiment, an elliptical two-dimensional spatial-frequency limiting characteristic is obtained in Fourier space and image moiré is reduced.

Modifications

M-1: Modification in Shape of Path of Rotation

In the first and second embodiments, a case is described in which the glass plate 3 is rotated through one revolution during the exposure interval T of the image sensing device 4, i.e., in which the image of the subject formed on the sensing surface is rotated through one revolution relative to the sensing surface. However, the present invention is not limited to one revolution.

As long as the operation for changing the relative position is performed for one or more revolutions during the exposure interval T of the image sensing device 4, any number of revolutions will suffice. In this case, it is possible for the locus of revolution of the position offset from the optic axis (this path shall be referred to simply as "trap frequency position" below) to be given a shape other than that of a circle or ellipse. In a case where the trap frequency position is established on a circle or ellipse, the glass plate 3 need only be rotated an integral number of times during the exposure interval T of the image sensing device 4. The greater the number of times the glass plate 3 is rotated during the exposure interval T of the image sensing device 4, the more the error components stemming from a change in relative position can be reduced by averaging.

M-2: Modification in Terms of Rotational Velocity

In the first and second embodiments, the glass plate 3 is rotated at a uniform angular velocity (α=const), though this is not a requirement. It is possible for the trap frequency position to be given a shape other than the shape of a circle or ellipse.

M-3: Modification in Terms of Rotational Velocity

In the first and second embodiments, the means for revolving the image of the subject, which is formed on the image sensing device, with respect to the image sensing device is realized by rotating the glass plate 3 in an inclined attitude. However, the present invention is not limited to this arrangement. For example, a variable angle prism of the kind described in the specification of Japanese Patent Application No. 6-250649 may be used to deflect the luminous flux, which passes through the prism, at a constant angle relative to the optic axis of the lens. In this case the direction of the inclined surface of the prism is controlled in time-series fashion so that the image of the subject formed on the sensing surface is revolved along a circle or ellipse while its horizontal and vertical orientation is maintained. Further, the image of the subject formed on the sensing surface can be revolved along a circle or ellipse while its horizontal and vertical orientation is maintained by oscillating two mirrors synchronously in mutually different directions, by a method in which all or part of the photographic lens is moved or by a method in which the image sensing device itself is moved by piezoelectric elements or the like.

M-4: Rotation of Image Sensing Device

In the first and second embodiments, the spatial filter device is constructed by the glass plate 3, which is for shifting the optic axis along the optical path of the optical system, and the rotating device 6, which is for rotating the glass plate 3 along a circular or elliptical path. However, the spatial filter device of the present invention is capable of realizing the function which limits the spatial frequency characteristic of the optical system even if the image sensing device itself is rotated in a plane perpendicular to the optic axis.

Figure 9:
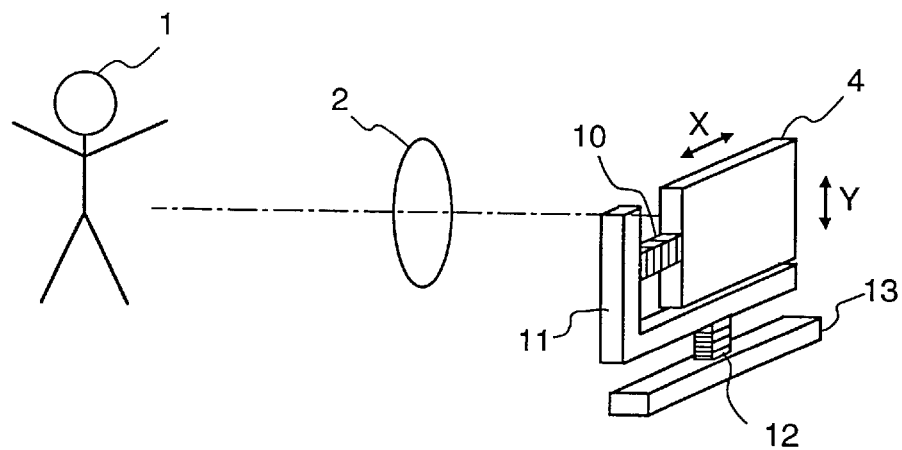
FIG. 9 is a schematic view showing part of an image sensing apparatus according to a second embodiment of the present invention.

FIG. 9 is a schematic view showing part of an image sensing device according to this modification.

According to this modification, the image sensing device 4 itself is revolved by piezoelectric elements along a circle or ellipse in a plane perpendicular to the optic axis, whereby a two-dimensional spatial-frequency limiting characteristic is obtained.

Shown in FIG. 9 are the subject 1 and the image sensing optical system 2. A piezoelectric element 10 oscillates the image sensing device 4 horizontally (along the X direction) in a plane perpendicular to the optic axis, a holding member 11 holds the image sensing device 4 in the horizontal direction, a piezoelectric element 12 oscillates the image sensing device 4 vertically (along the Y direction) in a plane perpendicular to the optic axis, and a holding member 13 holds the image sensing device 4 in the vertical direction.

The piezoelectric elements 10, 11 are mechanically deformed in conformity with an electric current supplied by a driver (not shown). Accordingly, applying a current $$K \cdot \cos(\alpha t)$$

to the piezoelectric element 10 and a current $$K \cdot \sin(\alpha t)$$

to the piezoelectric element 12 causes the image sensing device 4 to undergo circular motion at a uniform velocity, namely at the angular velocity $\alpha$, in a plane perpendicular to the optic axis. In other words, by making K and $\alpha$ constant, a function the same as that of the spatial filter of the first embodiment is realized.

Furthermore, the radius of this circular motion at uniform velocity can be changed by changing the amplitude K. Accordingly, the image of the subject formed on the image sensing device 4 can be rotated along a circle of any radius r with respect to the image sensing device 4 while the orientation of the image is maintained.

Further, the image of the subject formed on the image sensing device 4 can be rotated along an ellipse of any major axis $r_L$ and any minor axis $r_S$ with respect to the image sensing device 4 while the orientation of the image is maintained by making the amplitudes of the currents applied to the piezoelectric elements 10, 12 different from each other. In other words, the path of the second embodiment can be achieved.

Third Embodiment

In the first and second embodiments, the locus of the trap frequency is monotonous. The first and second embodiments obtain a desired trap frequency in each of horizontal and vertical directions. In a spatial filter device according to the third embodiment, the locus of the trap frequency is upon a locus obtained by modifying one locus function by another function. Specifically, the third embodiment obtains a plurality of desired trap frequencies in each of horizontal and vertical directions.

The principle of the third embodiment will now be described.

When a locus which changes the relative position between the image sensing device and the image of the subject formed on this image sensing device is generated, the locus is described as a linear combination of two changes in relative position.

If we let a (t) represent a high-speed change in relative position and b(t) a low-speed change in relative position, then a change f(t) in relative position obtained by superposing these two changes will be expressed as follows:

$$f(t)=a(t)+b(t) \tag{18}$$

Since the low-speed change b(t) in relative position plays almost no part in an infinitesimal time $\Delta t$ (=T/n), we have $$a(t+\Delta t) \neq a(t)$$

$$b(t+\Delta t) \approx b(t) \tag{19}$$

where T represents the exposure time and n is a positive integer. Accordingly, a Fourier transform F($\omega$) of the change f(t) in relative position is as follows:

$$F(\omega) = \int_0^T e^{-j\omega\{a(t)+b(t)\}} dt \tag{20}$$

$$= \sum_{i=1}^n \int_{\Delta t(i-1)}^{\Delta t(i)} e^{-j\omega\{a(t)+b(t)\}} dt$$

$$= \sum_{i=1}^n \int_{\Delta t(i-1)}^{\Delta t(i)} e^{-j\omega a(t)} \cdot e^{-j\omega b(t)} dt$$

$$= \sum_{i=1}^n \left\{ e^{-j\omega b(\Delta t(i))} \int_{\Delta t(i-1)}^{\Delta t(i)} e^{-j\omega a(t)} dt \right\}$$

If we assume that a(t) is a periodic function of the period $\Delta t/m$ (where m is a positive integer), then we have $$\int_{\Delta t(i-1)}^{\Delta t(i)} e^{-j\omega a(t)} dt = A(\omega, \Delta t(i)) = A(\omega) \quad (21)$$

where $A(\omega)$ is a Fourier transform of $a(t)$. This gives us $$\begin{aligned} F(\omega) &= A(\omega) \cdot \sum_{i=1}^{n} e^{-j\omega b(t)} \\ &= A(\omega) \cdot \sum_{i=1}^{n} \int_{\Delta t(i-1)}^{\Delta t} e^{-j\omega b(t)} dt \\ &= A(\omega) \cdot \int_{0}^{T} e^{-j\omega b(t)} dt \\ &= A(\omega) \cdot B(\omega) \end{aligned} \quad (22)$$

Accordingly, the spatial frequency characteristic of the change f(t) obtained by superposing the high-speed periodic relative positional change a(t) and the low-speed periodic relative positional change b(t) is equal to the product of the spatial frequency characteristics, namely to $A(\omega) \cdot B(\omega)$.

The spatial filter of the third embodiment provides an excellent spatial-frequency limiting characteristic on the basis of this principle.

Equation (18) indicates addition while Equation (22) indicates multiplication. Accordingly, the modulation of one relative positional change by another relative positional change shall be referred to as "superposition" in the third embodiment.

Figure 10:
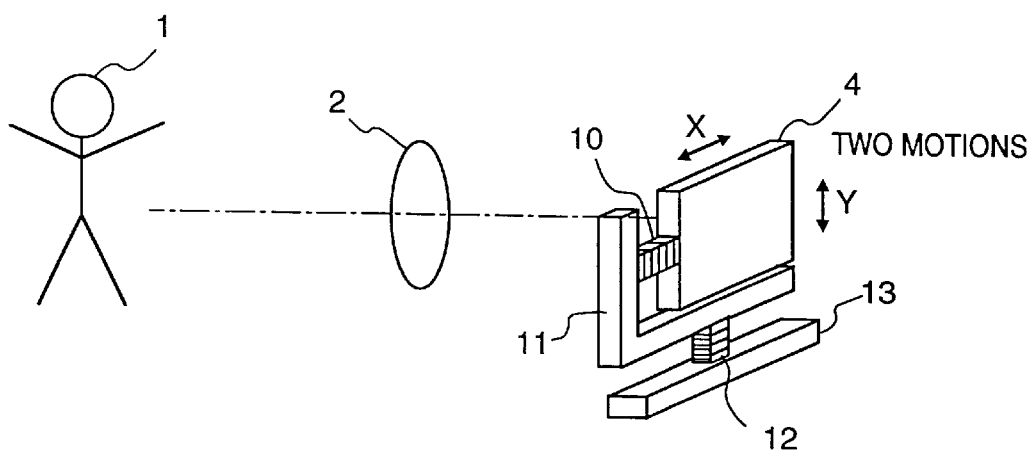
FIG. 10 is a diagram showing the configuration of an image sensing apparatus according to a third embodiment of the present invention.

The arrangement of the third embodiment will be described in further detail. FIG. 10 is a diagram showing the construction of an image sensing apparatus according to the third embodiment.

The image sensing apparatus of the third embodiment is so adapted that the image sensing device 4 itself is capable of being moved horizontally and vertically in a plane perpendicular to the optic axis using piezoelectric elements. In FIG. 10, the optical system 2 forms the image of the subject 1 on the image sensing device 4. The piezoelectric element 10 moves the image sensing device 4 horizontally (along the X direction) in a plane perpendicular to the optic axis the holding member 11 holds the image sensing device 4 in the horizontal direction, the piezoelectric element 12 moves the image sensing device 4 vertically (along the Y direction) in a plane perpendicular to the optic axis, and the holding member 13 holds the image sensing device 4 in the vertical direction.

The piezoelectric elements 10, 11 are mechanically deformed in conformity with an electric current supplied by a driver (not shown). Applying the current $K \cdot \cos(\alpha t)$ to the piezoelectric element 10 and the current $K \cdot \sin(\alpha t)$ to the piezoelectric element 12 causes the image sensing device 4 to undergo circular motion at a uniform velocity, namely at the angular velocity $\alpha$, in a plane perpendicular to the optic axis so that a circular change in relative position is produced between the image of the subject and the image sensing device 4 in the same manner as in the first embodiment (as illustrated in FIG. 3). The radius r of the circle can be changed by varying the amplitude K. Accordingly, the relative position between the image sensing device 4 and the image of the subject formed on the image sensing device 4 can be made to vary along a circle of any radius r.

The circular change in relative position makes one revolution in an exposure interval 0~T of the image sensing device 4, and the rotational motion is controlled so as to result in rotation at a uniform velocity, namely at the angular velocity $\alpha$ (=const). The coordinates (x, y) of the point at which an image is formed on the image sensing device 4 at time t are as follows, just as in the first and second embodiments:

$$x = r \cdot \cos \alpha t$$
$$y = r \cdot \sin \alpha t \quad (23)$$

In the third embodiment also, in a manner similar to that of the first and second embodiments, the image of the subject formed at a point on the image sensing device 4 in the exposure interval 0~T of the image sensing device 4 is the same as an image obtained when the image of the subject, which has passed through a spatial filter having a characteristic determined by the Fourier transform to Equation (23), is formed at a point on the image sensing device 4. The description of superposition in Equation (22) is applied with regard to the Fourier transform of Equation (23) as well.

Accordingly, in the third embodiment as well, a two-dimensional Fourier transform of a function f(x) generally is written as follows:

$$F(u, v) = \int \int_{-\infty}^{\infty} f(x, y) e^{-2\pi i (ux + vy)} dx dy \quad (24)$$

When coordinate transformations (FIGS. 4A and 4B) identical with those of the first embodiment are performed, Equation (24) is transformed to $$F(\rho, \phi) = \int_{0}^{\infty} r \cdot f(r) dr \int_{0}^{2\pi} e^{-2\pi i r \rho \cos(\theta - \phi)} d\theta \quad (25)$$

Equation (25) becomes as follows using a Bessel function of the first kind of order zero [see Equation (6) of the first embodiment]:

$$F(\rho) = 2\pi \int_{-\infty}^{\infty} r \cdot f(r) \cdot J_0(2\pi r \rho) dr. \quad (26)$$

Equation (26) is the same as Equation (7) of the first embodiment, and therefore the feature of the first embodiment is applied to the third embodiment as well. Since Equation (26) is a function solely of $\rho$, $F(\rho)$ has rotational symmetry. Accordingly, a spatial frequency characteristic based upon changing relative position along a circle, as in the first through third embodiments, is as follows:

$$F(\rho) = 2\pi r \cdot J_0(2\pi r \rho) \quad (27)$$

The cut-off frequency of the spatial filter according to the third embodiment is capable of being varied by changing the value of r.

In the third embodiment set forth above, a case is described in which a change in the relative position between the image sensing device and the image of the subject formed on the image sensing device makes one revolution during the exposure interval of the image sensing device 4. However, similar effects are obtained also in a case where the change in relative position makes a plurality of revolutions during the exposure interval of the image sensing device 4.

The frequency characteristic diagram of the spatial filter according to the third embodiment is that same as that shown in FIG. 5 of the first embodiment. More specifically, if we let $\omega_0$ represent the initial zero point of a Bessel function of the first kind of order zero, the trap characteristic of the spatial filter of the third embodiment becomes as follows:

$$r = \frac{\omega_0}{2\pi\rho} \quad (28)$$

Accordingly, r is decided by substituting the spatial frequency (trap frequency), which is desired to be made zero, into ρ in Equation (28).

Figure 11:
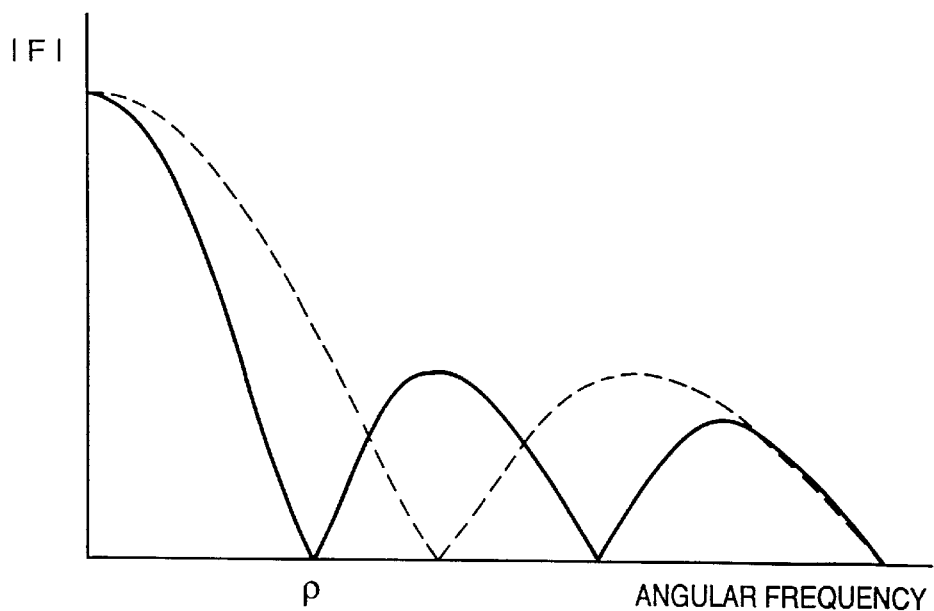
FIG. 11 is a characteristic diagram showing two superposed spatial-frequency limiting characteristics.
Figure 12:
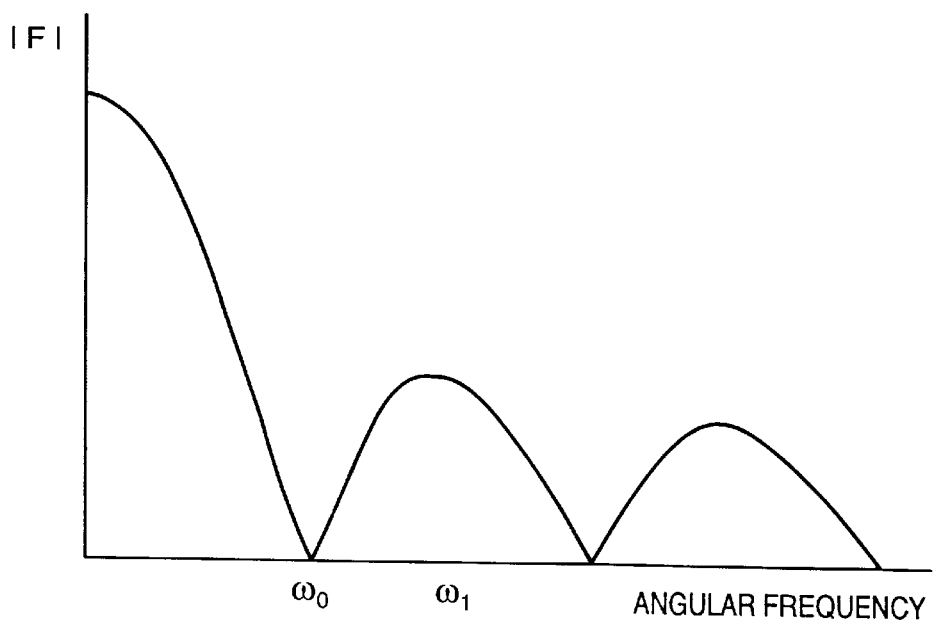
FIG. 12 is a characteristic diagram illustrating a one-dimensional graph of a spatial frequency characteristic based upon rotating an optic axis along a circle.

With regard to the ideal characteristic of a spatial filter, it will suffice if the gain is zero at a frequency above the desired trap frequency. Accordingly, in the third embodiment, the change in relative position which realizes the filter characteristic indicated by the solid line in FIG. 11 and the change in relative position which realizes the filter characteristic indicated by the dashed line in FIG. 11 are superposed based upon the principle described above. More specifically, a low-speed relative positional change on a circle of radius $r_1$ and a high-speed relative positional change on a circle of radius $r_2$ derived in accordance with the following equations are superposed:

$$r_1 = \frac{\omega_0}{2\pi\rho} \quad (29)$$

$$r_2 = \frac{\omega_0}{\omega_1} \cdot r_1$$

where ρ represents the spatial frequency (trap frequency) desired to be made zero, $\omega_0$ the angular frequency at the initial zero point of a Bessel function of the first kind of order zero and $\omega_1$ the angular frequency (approximately 3.8 based upon a numerical table) in the vicinity of an initial extremal value larger than zero of a Bessel function of the first kind of order zero. See FIG. 12.

Figure 13:
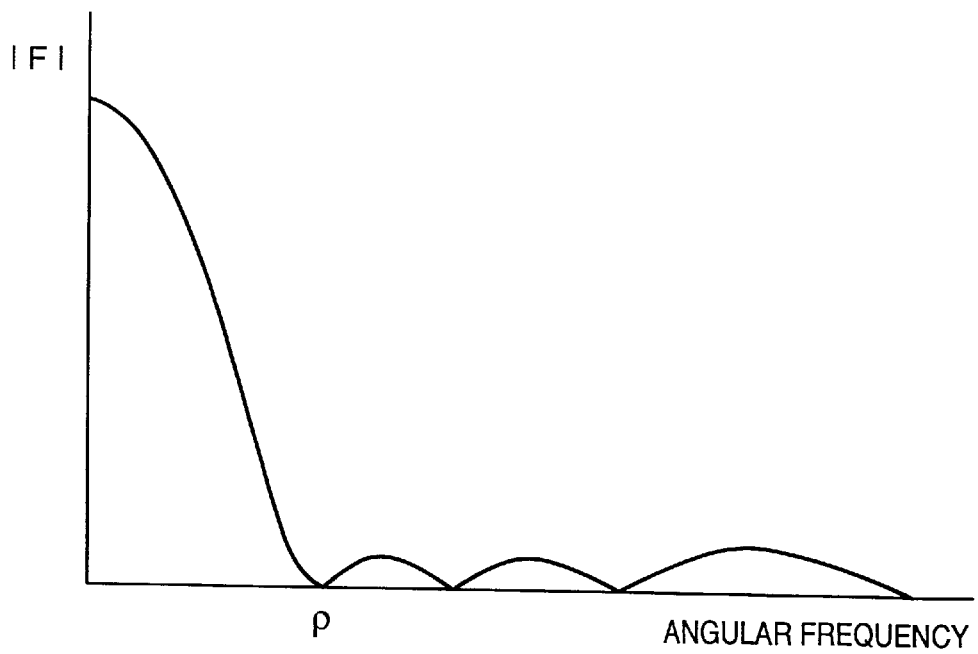
FIG. 13 is a characteristic diagram illustrating a spatial-frequency limiting characteristic realized by the third embodiment.

Since the two changes in relative position indicated in Equation (29) are both periodic, a similar characteristic (i.e., a periodic characteristic) is obtained even when the low-speed relative positional change on a circle of radius $r_1$, and the high-speed relative positional change on a circle of radius $r_2$ are superposed. The characteristic realized by the spatial filter of the third embodiment is illustrated in FIG. 13.

In the method according to the third embodiment, lower speed change of the changes in the two directions (the lowest speed change in a plurality of directions) is not required to be set a periodic change. That may be a linear motion. Setting to linear motion is useful for a still image sensing which completes only one exposure. The linear motion functions as a single dimensional low pass filter. Accordingly, where a still image sensing is necessary in which one trap frequency in the horizontal direction and two trap frequencies in the vertical direction occur, the arrangement of a high speed elliptical motion and a linear motion in the vertical direction give a useful low pass filter.

Example 1

In a case where the image sensing device 4 is a monochrome image sensing device having pixels in a square array, as shown in FIG. 14, the spatial sampling frequency of the image sensing device 4 is 1/P. In order to reduce aliasing distortion, therefore, the spatial frequency should be made half the sampling frequency. That is, the Nyquist frequency should be adopted as the trap frequency. Accordingly, by substituting $$\rho = \frac{1}{2P}$$

into Equation (29), $r_1$, $r_2$ are obtained in accordance with $$r_1 = \frac{\omega_0 P}{\pi} \approx 0.76P \quad (30)$$

$$r_2 = \frac{\omega_0}{\omega_1} \cdot r_1 \approx 0.48P$$

By controlling the current applied to the piezoelectric elements 10, 12 so as to bring about a change obtained by superposing a low-speed relative positional change on a circle of radius $r_1$ (≅0.76P) which makes one revolution during the exposure interval T of the image sensing device 4 and a high-speed relative positional change on a circle of radius $r_2$ (≅0.48P) which makes four revolutions during the exposure interval T, a two-dimensional characteristic in which the trap frequency is rendered circular is obtained and moiré possessed by the image is reduced.

In a case where the image sensing device 4 is a color image sensing device having pixels in a square array, as shown in FIG. 15, the spatial sampling frequency is 1/P with respect to the color images. It will suffice, therefore, to establish the equation: trap frequency ρ=1/(4P) in order to reduce color aliasing distortion. Accordingly, we have $$r_1 = 2\omega_0 P/\pi = 1.53P$$

$$r_2 = (\omega_0/\omega_1) \cdot r_1 = 0.96P$$

By controlling the current applied to the piezoelectric elements 10, 12 so as to bring about a change obtained by superposing a low-speed relative positional change on a circle of radius $r_1$ (≅1.53P) which makes one revolution during the exposure interval T of the image sensing device 4 and a high-speed relative positional change on a circle of radius $r_2$ (≅0.96P) which makes four revolutions during the exposure interval T, a two-dimensional characteristic in which the trap frequency is rendered circular is obtained and moiré possessed by the image is reduced.

Furthermore, since the sampling frequency is 1/P, in the same manner as in the monochrome image sensing device, with respect to a luminance image, photography is performed at a two-dimensional spatial-frequency limiting characteristic obtained by controlling the current applied to the piezoelectric elements 10, 12 in such a manner that the relations $r_1$=0.76P, $r_2$=0.48P will hold. A high-resolution color image is obtained by combining the color images.

In the case described above, the change in relative position between an image sensing device and the image of a subject formed on the image sensing device is circular. However, an arrangement may be adopted in which the change in the relative position is elliptical. In a case where the image sensing device 4 is a monochrome image sensing device having a non-square array of pixels in which the pixel pitch $P_H$ in the horizontal direction of the image sensing device 4 and the pixel pitch $P_V$ in the vertical direction are unequal, as shown in FIG. 16, $r_{H1}$, $r_{V1}$ and $r_{H2}$, $r_{V2}$ are obtained from Equation (29) in the respective directions and the current applied to the piezoelectric elements is controlled so as to obtain an ellipse in which these are the major and minor axes. As a result, a two-dimensional spatial-frequency limiting characteristic in which the trap frequency is elliptical in shape is obtained and moire possessed by the image is reduced.

Modifications of Third Embodiment

In the third embodiment, a low-speed change in relative position along a circle or ellipse makes one revolution during the exposure interval of the image sensing device 4, and a high-speed change in relative position along a circle or ellipse makes four revolutions during the exposure interval of the image sensing device 4. However, as long as the low-speed change in relative position make one or more revolutions, any number of revolutions will suffice. In this case it is possible for the trap frequency position of the two-dimensional spatial-frequency limiting characteristic due to the low-speed change in relative position to be given a shape other than that of a circle or ellipse. In a case where the trap frequency position of the two-dimensional spatial-frequency limiting characteristic is desired to be established on a circle or ellipse, it will suffice if the rotation is performed an integral number of times. Though it is preferred that the high-speed change in relative position be sufficiently faster than the low-speed change in relative position, a characteristic close to that desired will be obtained if the high-speed change in relative position is four or more times faster than the low-speed change in relative position. In a case where the change in relative position is rotated during the exposure interval of the image sensing device 4, the greater the number of revolutions, the more the error components stemming from a change in relative position can be reduced by averaging.

In the third embodiment, the change in relative position is performed at a uniform angular velocity, though this is not a requirement. It is possible for the trap frequency position to be given a shape other than the shape of a circle or ellipse.

In the third embodiment, the operation for varying the relative position between the image sensing device and the image of the subject formed on the image sensing device is implemented by moving the image sensing device itself using piezoelectric elements. However, the present invention is not limited to this arrangement. For example, it is permissible to use a method using a variable angle prism, a method using two mirrors or a method of moving all or part of the photographic lens, as described in the specification of Japanese Patent Application No. 6-250649, or a method of tilting and rotating a flat glass plate having parallel surfaces, a method of moving the image sensing device itself by a motor or the like, etc. It is also permissible to use a plurality of these relative position varying means in combination.

Furthermore, the high-speed change in relative position is not limited to a circle or ellipse. As long as the change is periodic, any change will suffice. For example, the change may be quadrangular or triangular.

In the third embodiment, the low-speed change in relative position is also a circular or elliptical periodic change. However, it is not required that this change be periodic. For example, the change may be linear motion.

In the third embodiment, a case is described in which two changes in relative position are superposed. However, it is permissible to superpose many changes in relative position.

According to the first and second embodiments, luminous flux is made to rotate by rotating a glass plate on the optical path, with the end result being that the trap frequency is controlled in real-time through a simple arrangement. In the third embodiment, the image sensing device is rotated.

Fourth Embodiment

In the fourth embodiment, the optical lens is moved back and forth.

The optical filter device according to the fourth embodiment can be applied to a video camera capable of image sensings, a video camera capable of sensing both moving and still images and an electronic still-video camera capable of sensing still images.

An image sensing apparatus in which the filter of the present invention is applied to a video camera will be described as the fourth embodiment.

Figure 17:
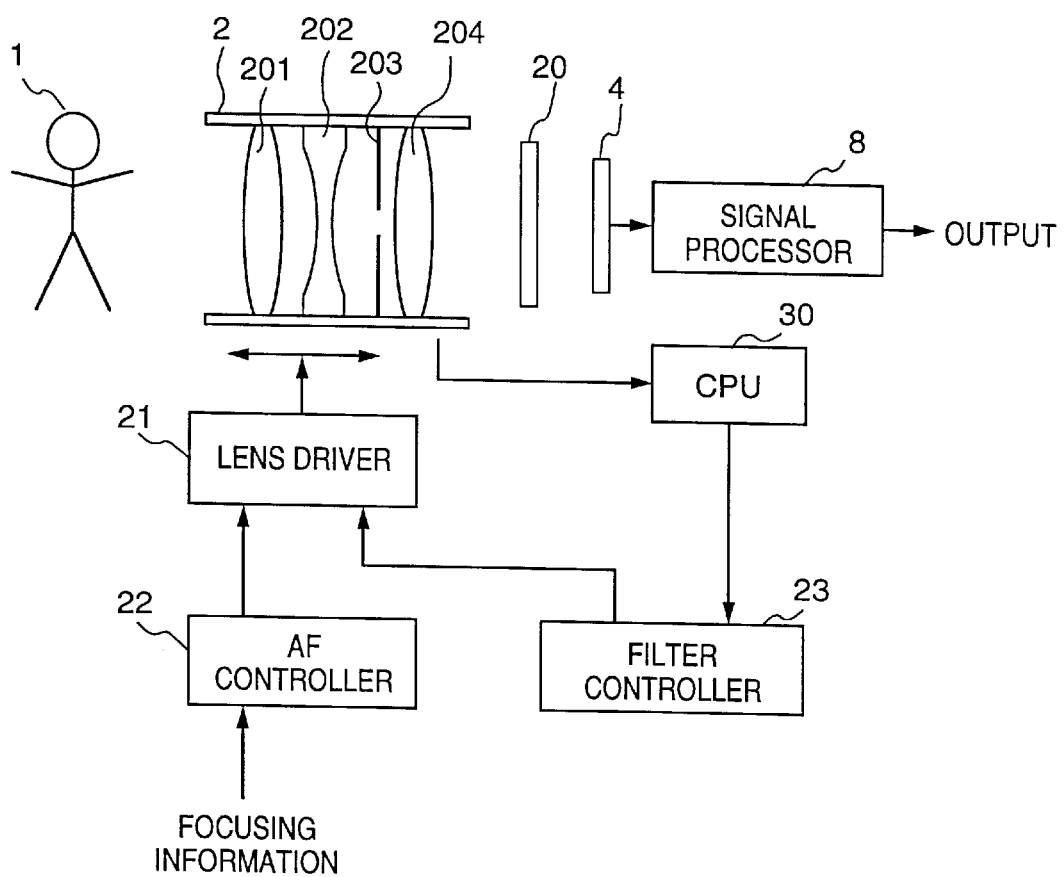
FIG. 17 is a diagram showing the arrangement of the principal portion of an image sensing apparatus, according to a fourth embodiment of the present invention.

FIG. 17 is a diagram showing the arrangement of the principal portion of a video camera according to the fourth embodiment.

Shown in FIG. 17 are the subject 1 and the optical system 2, which comprises lenses 201, 202, 204 and a diaphragm 203, by way of example. Numeral 20 denotes an infrared cutting filter. Numeral 4 denotes the image sensing device. The infrared cutting filter 20 removes unnecessary infrared light from the image of the subject formed by the optical system 2, after which the image is formed on the image sensing device 4. Numeral 8 denotes the signal processor, 30 a CPU, 23 a low-pass filter controller, 21 a lens driver and 22 an AF (automatic focusing) controller.

The output signal of the image sensing device 4 subjected to various processing by the signal processor 8, which produces an image signal. The image signal is delivered to an output device such as a monitor (not shown) or to a recording device such as a magnetic disk. In order to focus on the subject automatically, the AF controller 22 controls the lens driver 21, which comprises a motor and the like, based upon focusing information, thereby moving the optical system 2 along the optic axis. Accordingly, the image of the subject is formed on the image sensing device 4 in the focused state. The computation of the focusing information may be implemented by a method of calculation from the high-frequency components of the image signal or a method of calculation based upon a difference between positions of the subject image that has passed through different pupil positions of the optical system.

In the fourth embodiment, the target trap frequency is obtained by moving the optical system 2, as will be described later. The amount of movement of the optical system 2 is calculated from various information relating to the optical system 2, such as the value of the diaphragm opening and the sensitivity of the lens. The filter controller 23 controls the lens driver 21 on the basis of the calculated amount of movement during a single exposure interval T of the image sensing device 4; thereby moving the optical system 2 along the optic axis.

Figure 18:
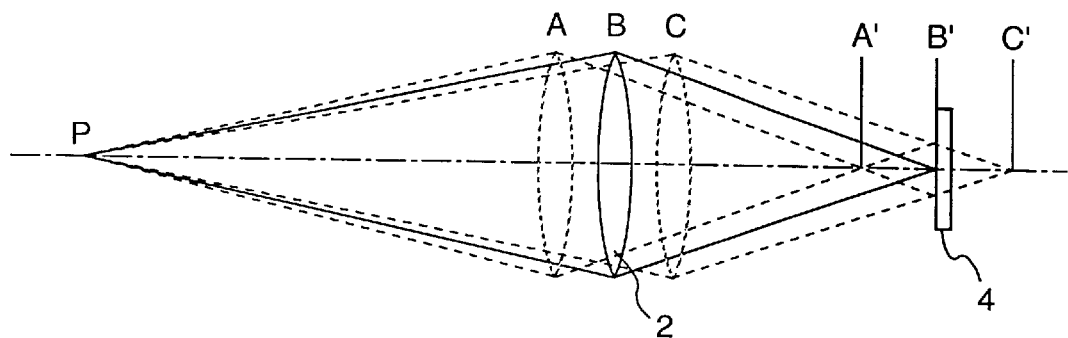
FIG. 18 is diagram illustrating the principle of an image sensing apparatus according to the fourth embodiment.
Figure 19:
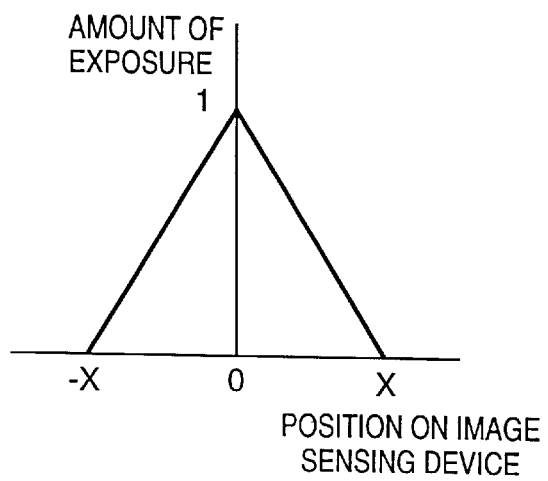
FIG. 19 is diagram illustrating the principle of an image sensing apparatus according to the fourth embodiment.
Figure 20:
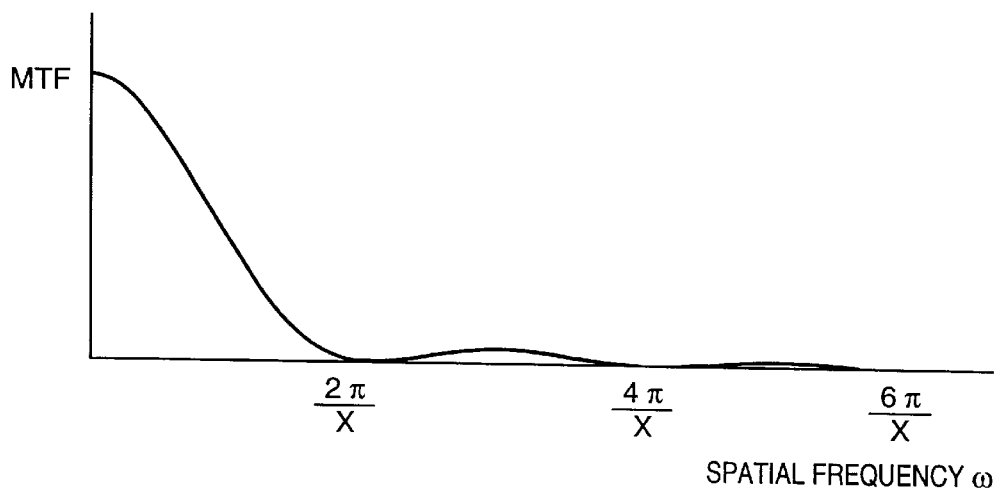
FIG. 20 is diagram illustrating the principle of an image sensing apparatus according to the fourth embodiment.

FIGS. 18 through 20 are diagrams illustrating the principle of the fourth embodiment.

In a case where the optical system 2 is at position B in FIG. 18, a point P on the subject has its image formed in a focused state at a position B' on the photosensitive surface of the image sensing device 4. If the optical system 2 is at position A or C in FIG. 18, the point P on the subject has its image formed at position A' or C', respectively, and therefore a blurred image is sensed at the photosensitive surface of the image sensing device 4.

The amount of exposure of the image at point P formed on the image sensing device 4 by moving the optical system 2 from position A to position B during one exposure interval of the image sensing device 4 is represented by the sum total of the amounts of exposure at each of the positions from A to B. Accordingly, if the optical system 2 is moved at a uniform velocity, for example, the point P has its image formed on the image sensing device in the manner shown in FIG. 19.

In other words, if the traveling distances BA and BC of the optical system 2 are set in such a manner that the relation $$A'B'=B'C'$$

will hold, then the spread of the image of point P on the image sensing device 4 will be $-X \sim X$ in a direction parallel to the light-receiving surface of the image sensing device 4 when the in-focus position is at A' or C'. The amount of exposure, therefore, is minimum at point X or $-X$ and maximum at point 0 on the sensing surface, as shown in FIG. 19.

Moving the optical system 2 in the manner shown in FIG. 18 means that the optical system 2 functions as an optical filter. The spatial-frequency characteristic MTF of this optical spatial filter is obtained by subjecting the characteristic of phase space in FIG. 19 to a Fourier transform in frequency space. This spatial frequency characteristic is illustrated in FIG. 20.

FIG. 19 illustrates one dimension on the image sensing device for reasons of simplicity; in actuality, there are two dimensions. Accordingly, the spatial frequency characteristics obtained are also two-dimensional.

In the fourth embodiment, the variable spatial frequency characteristic thus obtained is used as a spatial-frequency limiting characteristic for the purpose of eliminating aliasing distortion.

The range and direction of movement of the optical system 2 are optional depending upon the purpose of using the optical system as a filter. However, in order to perform photography with the best focus of the image of the subject, it is desired that the optical system 2 be moved back and forth substantially about a position thereof that will cause the in-focus position of the image of the subject to coincide with the photosensitive surface of the image sensing device 4.

Figure 21:
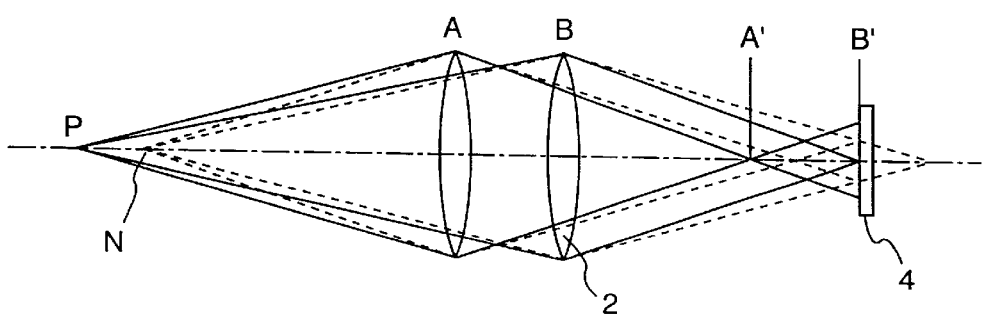
FIG. 21 is a diagram for describing optimum range of movement of a lens.
Figure 22:
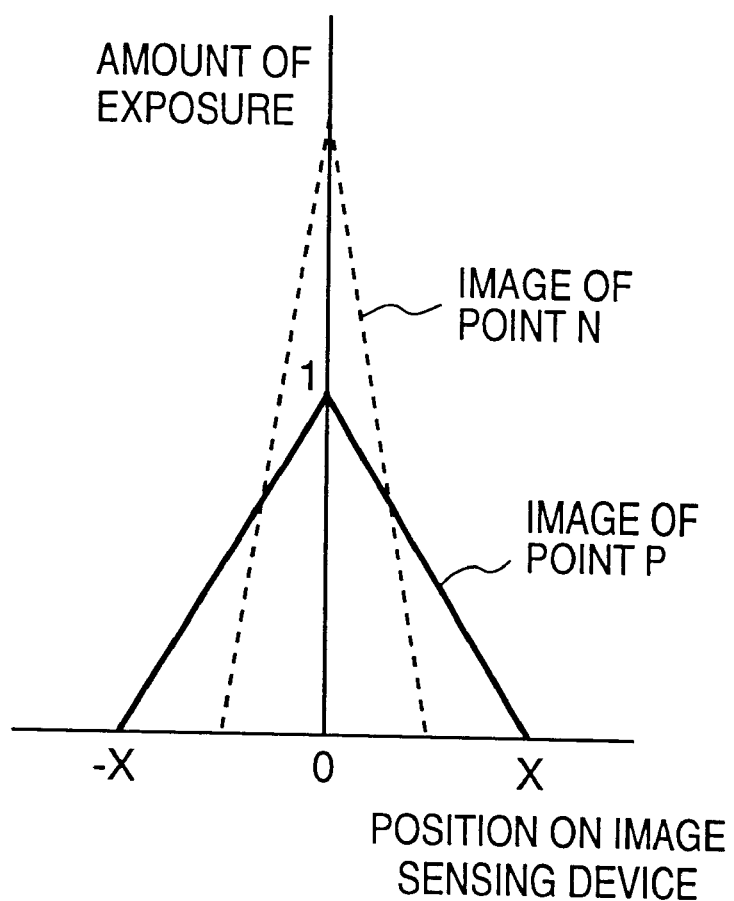
FIG. 22 is a diagram for describing optimum range of movement of a lens.

The reasons for this will be described with reference to FIGS. 21 and 22.

Assume that when the optical system 2 is at the position B, the point P on the subject has its image formed in a focused state on the photosensitive surface of the image sensing device 4. In a case where the optical system 2 has been moved from A to B, the image P of the subject formed on the image sensing device 4 is represented by the sum total of the image-formation times of the image of point P at each of the positions from A to B. The result is the solid line in FIG. 22. On the other hand, the distribution of the amount of exposure of the image at a point N offset slightly toward the image sensing device 4 from the point P (where the point N is located at a position whose image is formed at a point between A' and B' by the optical system 2) is a shown by the dashed line in FIG. 22. As long as focusing is judged in accordance with the amount of exposure, an image which appears to be in best focus will become the image at point N, at which there is little spread on the photosensitive surface of the image sensing device 4. Accordingly, an image signal for which the best focus is achieved with respect to a desired subject is obtained by moving the image sensing device 4 along the optic axis in such a manner that the in-focus position of the image of the subject will be approximately centered on the exposure surface of the image sensing device 4.

Modification of Fourth Embodiment

In the arrangement of the image sensing apparatus shown in FIG. 17, the entire optical system 2 is moved along the optic axis. However, an arrangement may be adopted in which only part of the optical system 2 is moved along the optic axis. Since the weight of the components moved will be less in this case, the load on the lens driver 21 is reduced and less power is consumed. Another advantage is a reduction in size. In addition, the optical system 2 is not limited to a single focal-point lens; a zoom lens can be used as well. The arrangement in such case would be one in which the focusing lens is moved.

In accordance with the fourth embodiment, as described above, it is possible to provide a video camera in which an excellent, variable two-dimensional spatial-frequency characteristic is obtained through a simple arrangement.

Further, by combining the mechanism for moving the optical system with an automatic focusing mechanism already installed in a video camera or the like, as in the fourth embodiment, advantages obtained are simplification of the apparatus and a reduction in the number of component parts.

Fifth Embodiment

Figure 23:
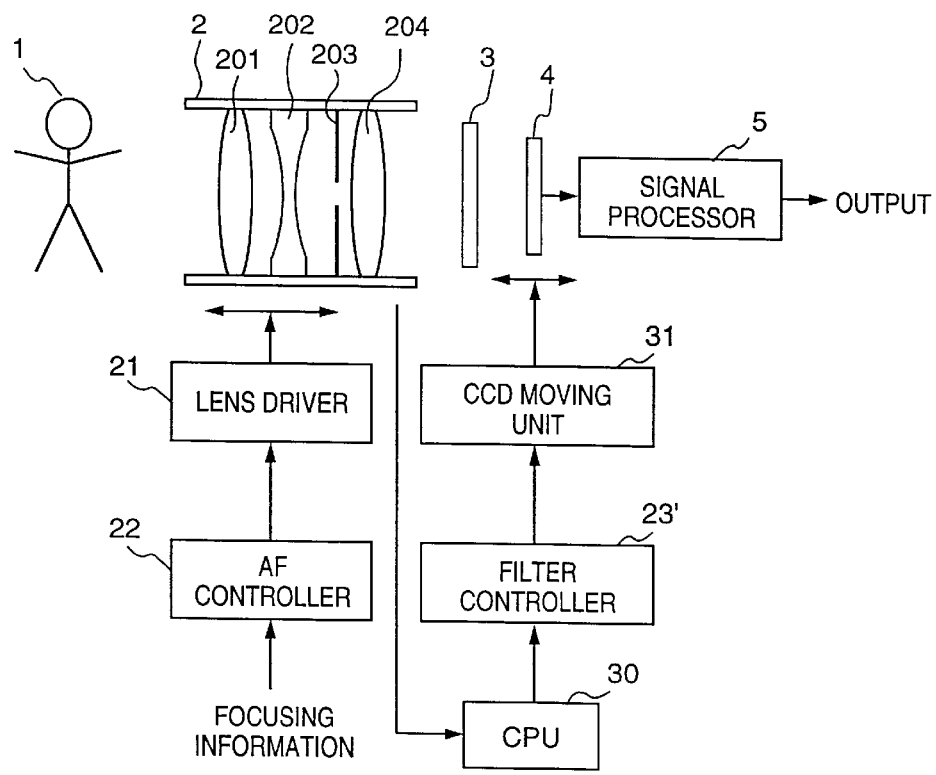
FIG. 23 is a diagram showing the arrangement of the principal portion of an image sensing apparatus according to a fifth embodiment of the present invention.

In the fourth embodiment, a spatial-frequency limiting characteristic is realized by moving the optical system 2 along the optic axis. However, as shown in FIG. 23, an arrangement may be adopted in which the image sensing device 4 is moved along the optic axis instead of the optical system 2. Such an example will now be described as the fifth embodiment.

Elements in FIG. 23 identical with those shown in FIG. 17 are designated by like reference characters and need not be described again.

Numeral 31 in FIG. 23 denotes means for moving the image sensing device, that is a CCD moving unit which comprises a motor or the like. On the basis of various information relating to the optical system 2, such as the value of the diaphragm opening and the sensitivity of the lens, the CPU 30 calculates an amount of movement of the image sensing device 4 necessary to obtain a desired spatial-frequency limiting characteristic. A filter controller 23' corresponds to the controller 23 of the fourth embodiment. On the basis of the calculated amount of movement, the filter controller 23' controls the CCD moving unit 31 to move the image sensing device 4 along the optic axis, whereby the desired filter characteristic is obtained.

In the fifth embodiment, the lens driver 21 differs from that of the fourth embodiment and is for controlling automatic focusing.

Figure 24:
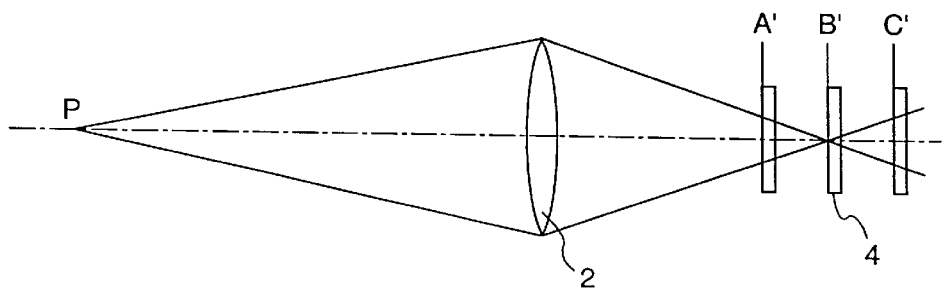
FIG. 24 is a diagram for describing the principle of the fifth embodiment.

FIG. 24 is a diagram illustrating the principle of this embodiment in which the image sensing device is moved.

A point P on the subject has its image formed in a focused state on the photosensitive surface of the image sensing device 4 at a position B'. If the photosensitive surface of the image sensing device 4 is at position A' or C' owing to movement of the image sensing device 4, the image of the point P on the subject will become blurred. Accordingly, a two-dimensional spatial-frequency limiting characteristic is obtained in the same manner as in the fourth embodiment.

By adopting an arrangement in which the image sensing device 4 is moved in this manner, the spatial-frequency limiting characteristic can be controlled independently of automatic focusing control. Further, the CCD moving unit 31 can be of any time whatsoever. For example, the spatial-frequency limiting characteristic can be varied by using a piezoelectric element having a good response.

In the present invention, it is preferred that the optical system be a telecentric system for the purpose of reducing offset of the image-forming point from the axis.

As many apparently widely different embodiments of the present invention can be made without departing from the spirit and scope thereof, it is to be understood that the present invention is not limited to the specific embodiments thereof except as defined in the appended claims.

What is claimed is:

1. An image sensing apparatus comprising:

image forming means for forming an image for luminance signal and an image for color signal of a subject on a sensing surface of an image sensing device;

optical image rotating means for rotating an optical image of the subject during an exposure interval of said image sensing device in such a manner that the optical image makes one or a plurality of revolutions relative to the sensing surface along a plane perpendicular to the surface of said image sensing device while orientation of the optical image is substantially maintained vertically and horizontally with respect to the surface of said image sensing device, said optical image rotating means forming the optical image of the subject on the sensing surface via said image forming means; and setting means for setting a size of a rotational path of the optical image of the subject by said optical image rotating means, the size being determined according to a pitch of pixels of said image sensing device in the case of forming the image for luminance signal by the image of forming means, and the size being determined according to an arranging period of a color filter of said image sensing device in the case of forming the image for color signal by the image forming means.

2. The apparatus according to claim 1, wherein a path of rotation of an image by said optical image rotating means is closed in the plane perpendicular to an optical axis of said image forming means.

3. The apparatus according to claim 2, wherein the shape of the cross section of the path of rotation is substantially circular or elliptical.

4. The apparatus according to claim 1, wherein said optical image rotating means has a glass plate with parallel and flat surfaces, said glass plate being rotated about the optic axis of said image forming means while inclined with respect to the optic axis.

5. The apparatus according to claim 1, wherein said optical image rotating means has means for rotating said image sensing device about an axis perpendicular to the surface of said image sensing device while orientation of said image sensing device is substantially maintained vertically and horizontally.

6. The apparatus according to claim 5, wherein a cross sectional path of rotation of said image sensing device by said optical image rotating means is closed.

7. The apparatus according to claim 6, wherein the shape of the cross sectional path is substantially circular or elliptical.

8. The apparatus according to claim 1, wherein said optical image rotating means rotates the image of the subject an integral number of revolutions during the exposure interval of said image sensing device.

9. The apparatus according to claim 1, wherein said optical image rotating means rotates the image of the subject at a uniform angular velocity.

10. The apparatus according to claim 1, wherein said optical image rotating means rotates the optical image of the subject relative to said image sensing device along a circular path of radius r, where r is expressed as follows:

$$r = \frac{\omega_0}{2\pi\rho}$$

and $\omega_0$ represents the initial zero point of a Bessel function of the first kind of order zero and $\rho$ represents spatial frequency, whereby intensity of the spatial frequency $\rho$ of an image signal sensed by said image sensing device is attenuated.

11. The apparatus according to claim 1, wherein said optical image rotating means rotates the optical image of the subject relative to said image sensing device along an elliptical path, in which the elliptical path has a major axis $r_L$ expressed as follows:

$$r_L = \frac{\omega_0}{2\pi\rho_L}$$

and a minor axis $r_S$ expressed as follows:

$$r_S = \frac{\omega_0}{2\pi\rho_S}$$

and $\omega_0$ represents the initial zero point of a Bessel function of the first kind of order zero and $\rho_L, \rho_S$ represent two spatial frequencies, whereby intensities of the spatial frequencies $\rho_L$ and $\rho_S$ of an image signal sensed by said image sensing device are attenuated.

12. The apparatus according to claim 11, wherein the spatial frequencies $\rho_L$ and $\rho_S$ are approximately half of the spatial sampling frequency by said image sensing device.

13. The apparatus according to claim 11, wherein said optical rotating means has means, into which two periodic signals having different velocities are entered, for periodically moving said image sensing device in two different directions.

14. The apparatus according to claim 1, wherein said optical rotating means includes:

an optical element placed between said image-forming means and said image sensing device for parallel-shifting the optic axis of said image-forming means; and means, into which two periodic signals having different velocities are entered, for periodically moving said optical element in two different directions.

15. The apparatus according to claim 13, wherein a slower velocity period of periodic motions in the two different directions is set to be four or more times a higher velocity period of said periodic motion.

16. The apparatus according to claim 14, wherein a slower velocity period of periodic motions in the two different directions is set to be four or more times a higher velocity period of said periodic motion.

17. The apparatus according to claim 13, wherein the two different directions are set so as to be mutually perpendicular.

18. The apparatus according to claim 14, wherein the two different directions are set so as to be mutually perpendicular.

19. An optical spatial filter device for controlling a spatial frequency characteristic of an optical image for luminance signal and an optical image for color signal delivered by an image forming optical system and formed on an image sensing device, said device comprising:

luminous flux rotating means for rotating a luminous flux, which is delivered by the image forming optical system, on a sensing surface of said image sensing device along a closed path along a plane perpendicular to the optic axis of said image forming optical system while orientation of the luminous flux is substantially maintained vertically and horizontally;

setting means for setting a size of a rotation al path of the optical image of the subject by said optical image rotating means, the size being determined according to a pitch of pixels of said image sensing device in the case of forming the image for luminance signal by the image forming optical system, and the size being determined according to an arranging period of a color filter of said image sensing device in the case of forming the image for color signal by the image forming optical system; and control means for controlling said luminous flux rotating means in such a manner that the luminous flux is made one or more revolutions of the size set by said setting means, during an exposure interval of said image sensing device.

20. The device according to claim 19, wherein a path of a rotation of the luminous flux is closed to form substantially circular or elliptical.

21. The device according to claim 19, wherein said luminous flux rotating means has a glass plate with parallel flat surfaces, which are rotated about the optic axis of said image forming optical system while inclined with respect to the optic axis.

22. The device according to claim 19, wherein said luminous flux rotating means has means for rotating said image sensing device while orientation of said image sensing device is substantially maintained vertically and horizontally.

23. The device according to claim 19, wherein said control means control said luminous flux rotating means in such a manner that the luminous flux is made an integral number of revolutions relative to the sensing surface during the exposure interval of said image sensing device.

24. The device according to claim 19, wherein said control means control said luminous flux rotating means in such a manner that the luminous flux rotates at a uniform angular velocity.

25. The device according to claim 19, wherein said luminous flux rotating means rotates the optical image of the subject relative to said image sensing device along a circular path of radius r, where r is expressed as follows:

$$r = \frac{\omega_0}{2\pi\rho}$$

and $\omega_0$ represents the initial zero point of a Bessel function of the first kind of order zero and $\rho$ represents spatial frequency, whereby intensity of the spatial frequency $\rho$ of an image signal sensed by said image sensing device is attenuated.

26. The device according to claim 19, wherein said luminous flux rotating means rotates the optical image of the subject relative to said image sensing device along an elliptical path,:in which the elliptical path has a major axis $r_L$ expressed as follows:

$$r_L = \frac{\omega_0}{2\pi\rho_L}$$

and a minor axis $r_S$ expressed as follows:

$$r_S = \frac{\omega_0}{2\pi\rho_S}$$

and $\omega_0$ represents the initial zero point of a Bessel function of the first kind of order zero and $\rho_L$, $\rho_S$ represent two spatial frequencies, whereby intensities of the spatial frequencies $\rho_L$ and $\rho_S$ of an image signal sensed by said image sensing device are attenuated.

27. The device according to claim 26, wherein the spatial frequencies $\rho_L$ and $\rho_S$ are approximately half of the spatial sampling frequency by said image sensing device.

28. A method of controlling a spatial frequency characteristic of an optical image for luminance signal and an optical image for color signal formed on an image sensing device and reducing aliasing distortion of the optical image, comprising the steps of:

determining a spatial frequency characteristic of the optical image on the basis of a pitch of pixels of the image sensing device in the case of forming the image for luminance signal, and on the basis of an arranging period of a color filter of said image sensing device in the case of forming the image for color signal;

obtaining a spatial-frequency limiting characteristic relationship between a zero-point frequency of the spatial frequency characteristic of the optical image, the zero-point frequency being on an image forming surface of said image sensing device when the optical image has been rotated at a predetermined rotational velocity about the optic axis, and radius of curvature of this rotation;

deciding radius of curvature which prevails when a trap frequency in the spatial frequency characteristic of said image sensing device is made to coincide with the zero-point frequency of the spatial-frequency limiting characteristic; and rotating the optical image, in accordance with a radius of curvature decided, at a predetermined velocity relative to the sensing surface of said image sensing device.

29. The method according to claim 28, wherein a glass plate with parallel and flat is used at said rotating step, said glass plate being rotated about an optic axis of an image while inclined with respect to the optic axis.

30. The method according to claim 28, wherein said rotating step rotates said image sensing device on said image sensing device while orientation of said image sensing device is substantially maintained vertically and horizontally.

31. The method according to claim 28, wherein said rotating step rotates a luminous flux an integral number of revolutions relative to a sensing surface of the image sensing device during the exposure interval of said image sensing device.

32. The method according to claim 28, wherein said rotating rotates the luminous flux at a uniform angular velocity.

33. The method according to claim 28, wherein said step of deciding the radius of curvature decides the radius of curvature in such a manner that $$r = \frac{\omega_0}{2\pi\rho}$$

holds, where r represents the radius of curvature, $\omega_0$ represents the initial zero point of a Bessel function of the first kind of order zero, and $\rho$ represents spatial frequency.

34. The method according to claim 28, wherein said step of deciding the radius of curvature decides the radii of curvature in such a manner that $$r_L = \frac{\omega_0}{2\pi\rho_L}$$

and $$r_S = \frac{\omega_0}{2\pi\rho_S}$$

hold, were $r_S$, $r_L$ represent two radii of curvature, $\omega_0$ represents the initial zero point of a Bessel function of the first kind of order zero, and $\rho_L$, $\rho_S$ represent two spatial frequencies.

35. The method according to claim 34, wherein the spatial frequencies $\rho_L$ and $\rho_S$ are approximately half of the spatial sampling frequency by said image sensing device.

36. The apparatus according to claim 1, wherein said optical rotating means includes:

an optical element placed between said image-forming means and said image sensing device for parallel-shifting the optic axis of said image-forming means; and means, into which a periodic signal and a linear signal whose change is lower than the periodic signal are entered, for moving said optical element in two different directions.

37. An image sensing apparatus comprising:

optical image rotating device to rotate an optical image of a subject during an exposure interval of an image sensing device in such a manner that the optical image makes one or a plurality of revolutions relative to the sensing surface along a plane perpendicular to the surface of said image sensing device while orientation of the optical image is substantially maintained vertically and horizontally with respect to the surface of said image sensing device; and setting devices arranged to set a size of a rotational path of the optical image of the subject by said optical image rotating device the size being determined according to a pitch of pixels of said image sensing device in the case of forming the image for luminance signal and the size being determined according to an arranging period of a color filter of said image sensing device in the case of forming the image for color signal.

* * * * *